Patented Oct. 20, 1931

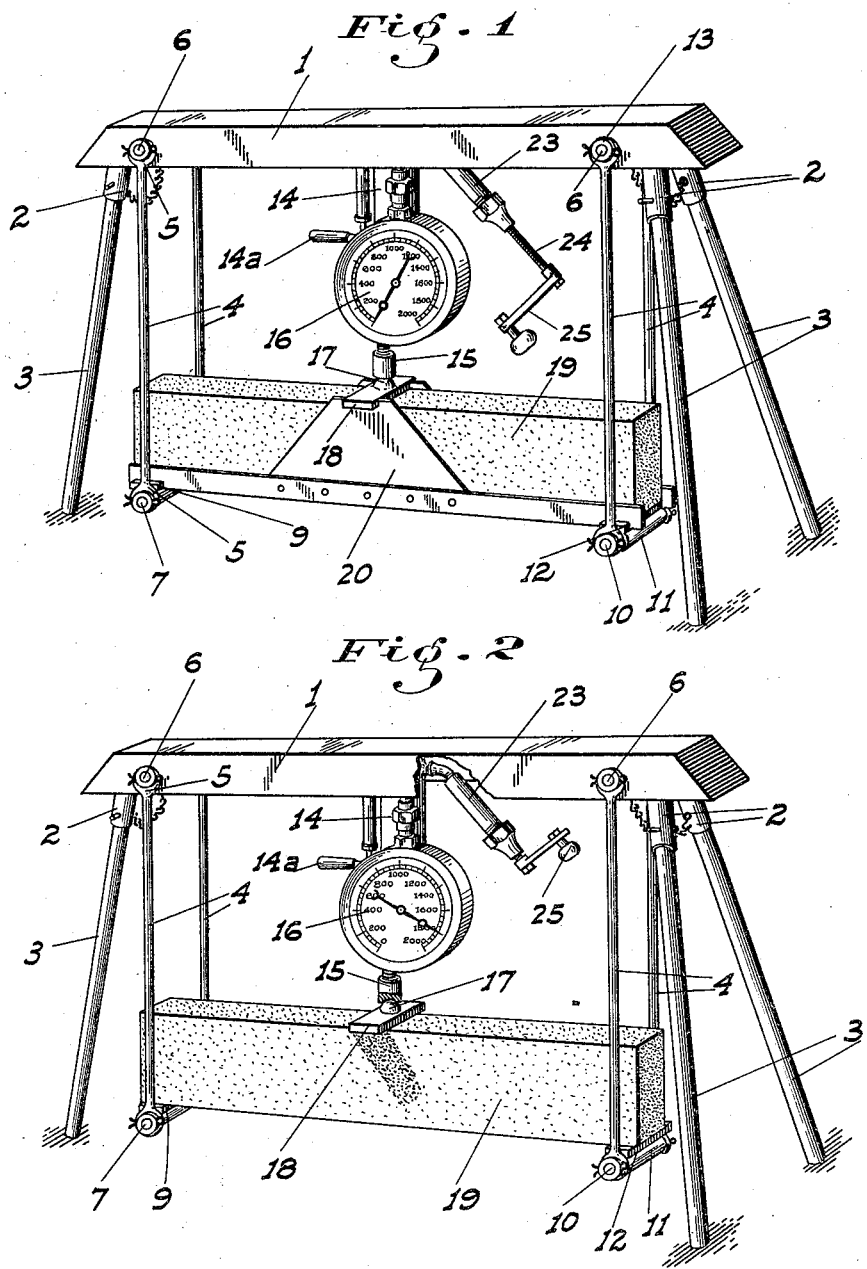

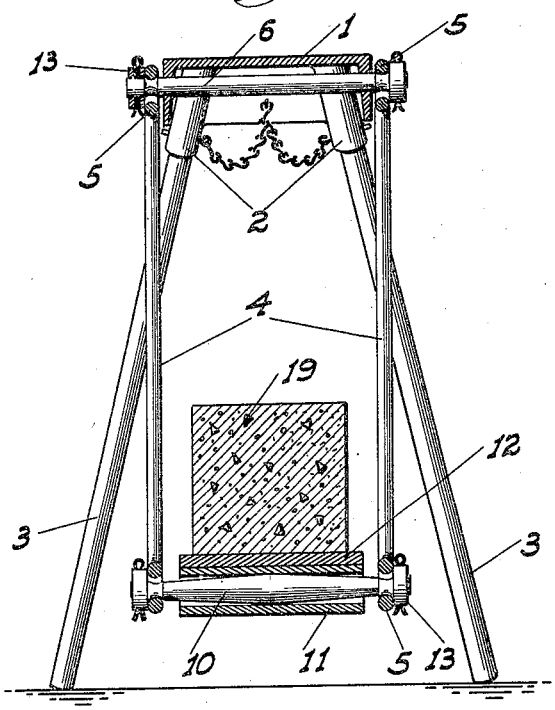
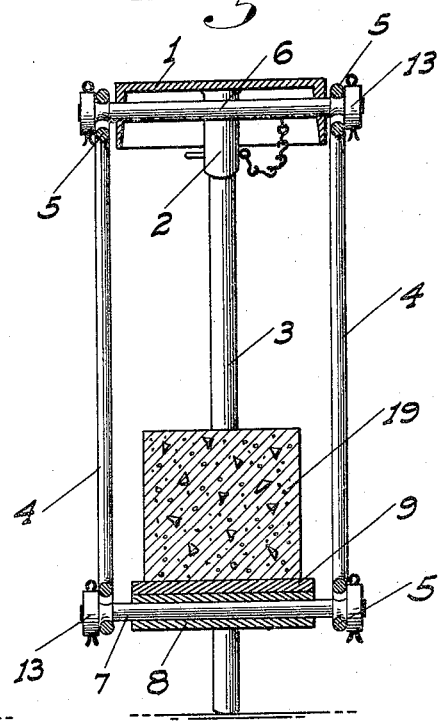
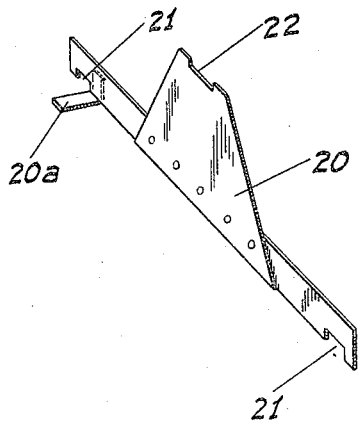
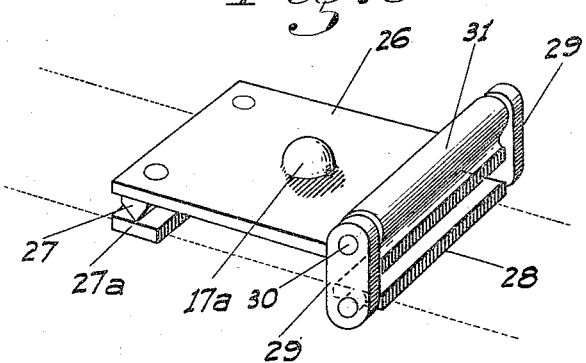
INVENTOR
V. E. Watts

1,827,805

UNITED STATES PATENT OFFICE

VILAS E. WATTS, OF SACRAMENTO, CALIFORNIA, ASSIGNOR OF ONE-THIRD TO GEORGE G. POMEROY, OF SACRAMENTO, CALIFORNIA

TRANSVERSE TESTING MACHINE

Application filed April 16, 1930. Serial No. 444,704.

This invention relates to testing devices and particularly to one for testing the breaking strength of beams. My testing device has been especially developed with a view to testing the strength of concrete used in highways, to determine whether the concrete is in a proper condition for service. When building concrete highways it is customary to pour a test beam from the same mix as that actually used on the road. It has also been determined that the concrete must be allowed to set for a certain length of time before being subjected to live load strains in order that it shall stand up under such loads. To obtain a proper result from a test of such a beam it is necessary that the testing apparatus shall exert all pressures on the same perpendicular to the horizontal axis of the beam and not to impose any secondary strains; and to provide a testing machine by which such results may be obtained in a simple and easy manner, forms one of the major objects of my invention.

A further important object of the invention is to construct the machine so that it is of a truly portable nature and which while having ample strength for its purpose, is still so light that it may be easily placed in the back of any automobile for transportation to one point or another. Certain parts of the machine are arranged to be dismantled or folded so as to make the structure very compact when being transported. This enables the testing crew to convey the apparatus to the beam, instead of vice versa. This allows the beams as poured on the job to be kept there for testing, instead of them having to be shipped to the testing laboratory as must now be frequently done.

A further object of the invention is to produce a simple and inexpensive device and yet one which will be exceedingly effective for the purpose for which this is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the testing apparatus, with a beam in place, and showing the trammels disposed to properly aline the pressure bar relative to the supporting bars of the apparatus.

Fig. 2 is a similar view with the trammels removed and the beam under pressure.

Fig. 3 is a transverse section of the apparatus taken through the beam support at one end.

Fig. 4 is a similar view taken through the beam support at the other end.

Fig. 5 is a perspective view of a trammel.

Fig. 6 is a perspective view of a modified form of presser bar unit.

Referring now more particularly to the characters of reference on the drawings, and at present to Figs. 1 to 5, the numeral 1 denotes the main frame or body member of the machine, preferably a beam of inverted channel form so as to be very rigid without being excessively heavy. This beam is supported from the ground by a tripod arrangement which comprises sockets 2 fixed on and depending from the beam, one at one end and two at the other, in which sockets legs 3 are removably mounted. All the legs are disposed at an outward slant relative to the longitudinal plane of the beam, while the adjacent pair of legs also slope outwardly relative to each other in a transverse plane. This arrangement provides a firm support for the beams regardless of inequalities in the surface on which the tester may be set up.

Depending from the outside of the beam on the opposite sides of the same and adjacent its ends are pairs of hanger rods 4 having eyes 5 at their opposite ends. The upper eyes are freely turnable on the outer end portions of transverse shafts 6 secured in and projecting across the beam as shown in Figs. 3 and 4.

The lower eyes of the pair of rods at one end of the machine turnably engage and support the ends of a transverse shaft 7. This shaft has a bushing 8 thereon on which is fixed a flat faced bar 9 extending parallel to the shaft or transversely of the beam 1. The lower eyes of the other pair of hanger rods also are freely turnable on and support a transverse shaft 10 which tapers outwardly from both ends to its center of length. A bushing 11 is turnable on this shaft, the bore or bushing being the same size throughout and normally engaging the shaft only at its center of length or at the widest point. This allows the bushing to swivel in a universal direction on the shaft as well as allowing the same to turn thereon, as will be evident. A flat bar 12 is secured to the bushing 11 and extends parallel thereto or transversely of the beam 1. The shafts 6 as well as the shafts 7 and 10 are provided on their ends, outwardly of the hanger rod eyes, with collars 13 to prevent the removal of said shaft relative to the hanger rods.

Secured on and depending from the beam 1 is a hydraulic jack 14 of standard make and of that type in which the jack plunger 15 is inverted or so that its advancing movement is downwardly instead of upwardly. The jack is provided with a pressure gauge 16 whereby any exerted pressure may be easily read. The jack is mounted so that its plunger is disposed in a vertical plane centrally between the upper shafts 6 and also centrally of the width of the beam. The lower end of the plunger is cupped and is adapted to engage a rounded knob 17 projecting upwardly from the center of a pressure bar 18. The beam 19 to be tested and which, as indicated in the preamble, is formed from the same mix used in the actual road being built, can be of any length and cross-section within the capacity of the machine. This enables test readings to be the same as, or such that they may be easily calculated to correspond to, tests actually made on the road itself if such were practicable.

The beam is supported on the bars 9 and 12, which are somewhat wider than the beam, as is the bar 18. Owing to the swivel mounting of the bar 12, as previously described, both said bars 9 and 12 will flatly engage the under surface of the beam regardless of any relative warp which the beam may have at its opposite ends. It is essential in order for the test readings to have the desired accuracy and to denote the actual strength of the beam that the bar 18 shall be centrally disposed between the points of support of the bars 9 and 12 with the beam 19 on both sides of the latter; that said bar 18 shall extend in a true transverse plane, and that the distance between the centers of the shafts 7 and 10 shall be the same as the distance between the centers of the fixed shafts 6. I therefore provide trammels for these parts. These trammels, one for each side, each comprises a rigid light plate structure 20 having notches 21 in its under face to seat over the bars 9 and 12 on one end between the adjacent side of the beam 19 and the hanger rods; and another notch 22 in its upper face centrally between the notches 21 to locate the pressure bar 18. The spacing between the notches 21 is such that when engaged with the bars the shafts 7 and 10 will be spaced apart exactly the same as the upper shafts 6. Each trammel also has an element 20a extending inwardly at right angles thereto and adapted to engage one side of the bar 9, so that the trammel will extend at right angles to said bar.

The trammels having been placed in position and the beam 19 being supported on the bars, the pressure bar 18 is placed on the beam and engaged with the notches 22. This will locate said bar so that it is not only in the proper transverse position but so that the knob 17 thereon will be in direct alinement with the jack plunger. The plunger is then advanced so as to engage said knob and hold the bar firmly against the beam.

The trammels are then removed, which may be easily done on account of the fact that the bottom of the notches 22 are below the top surface of the beam and hence are not engaged and held down by the bar 18. The pressure is then exerted on the bar 18 by advancing the plunger. This is first done by the actuation of the reciprocating handle 14a with which the jack is ordinarily equipped. This however naturally imparts a somewhat jerky or pulsating movement to the plunger. I have therefore provided an auxiliary and added plunger advancing means which comprises a relatively small cylinder 23 connected to the outer end of the jack cylinder, with a plunger in said cylinder 23 in the form of a screw 24 provided on its outer end with a crank-handle 25. The final advance of the jack plunger is therefore accomplished by advancing the plunger 24 which imparts a steady advancing movement to the jack plunger. Such advance is continued until fracture of the concrete results and the gauge reading recorded. If the beam withstands a specified pressure it is considered that the actual road is in condition to be put to use.

The test thus made accurately corresponds to the transverse strength of the pavement slab, since owing to the particular floating mounting of the beam being tested, only vertical downward strains are imparted to the beam by the pressure of the jack. Such pressure is without any lateral or other strains being placed on the beam which would render the test readings inaccurate. In this regard alone my improved machine is a great improvement over the present machines in which the test beam is mounted so that such lateral or other uneven strains are produced in the beam.

Also my apparatus is much lighter than the previous devices, and it may be easily placed in a relatively small space for transportation by merely removing the legs and folding the hanger rods along the beam 1.

If it is desired to do so the apparatus may be hauled along a road a relatively short distance without necessarily dismantling any part by merely inverting the machine and using the beam 1 as a road engaging sled; the ends of this beam being cut on a slope as shown so as to allow this to be readily done without danger of the beam catching against any obstruction in its path. The beam 18 as above described is for what is called the center point application of the pressure to the test beam. If desired however what is known as the third point bearing may be used in place of the center point method. This bearing or pressure member comprises a top plate 26 having an upstanding knob 17a centrally of its area to engage the jack plunger. From one end of this plate a transverse knife-edge member depends, which engages a bar 27a resting on the test beam. At the other end of the plate a similar beam engaging bar 28 is mounted. This bar however is flexibly suspended from the plate by links 29 connected to a cross shaft 30 which has swivel engagement with a sleeve 31 fixed on the plate. This shaft and sleeve arrangement are the same as the beam supporting shaft 10 and bushing 11 previously described and for substantially the same purpose, namely to enable the bars 27 and 29 to freely engage the beam regardless of any irregularities in the transverse alinement of the surface portions of the beam on which said bars rest.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A beam testing machine comprising a rigid member, means for supporting said member a certain distance from the ground, longitudinally spaced bars to support a test beam adjacent its ends, means suspending the bar from said member, and means mounted on said member to exert a downward pressure on the beam intermediate the ends thereof.

2. A beam testing machine comprising a rigid member, means for supporting said member a certain distance from the ground, hanger rods in pairs pivoted on and depending from the member; transverse bars supported by and extending between the corresponding pairs of bars at the lower ends thereof, said bars being adapted to support a test-beam adjacent the ends thereof, and means mounted on the member for exerting a downward pressure on the beam intermediate the ends thereof.

3. A structure as in claim 2 in which one of the beam-supporting bars is mounted for transverse vertical swivel movement in connection with the corresponding pair of bars.

4. A beam testing machine comprising a rigid member, means for supporting said member a certain distance from the ground, hanger rods in pairs pivoted on and depending from the member; transverse bars supported by and extending between the corresponding pairs of bars at the lower ends thereof, said bars being adapted to support a test-beam adjacent the ends thereof, another bar to rest on and extend across the beam intermediate its ends, and means mounted on the member to engage and exert a downward pressure on said last named bar.

5. A structure as in claim 4, with means for detachable engagement with all said bars to cause the hanger rods, and bars when engaged with the beam, to be parallel to each other.

6. A beam testing machine comprising a rigid member, means for supporting said member a certain distance from the ground, hanger rods in pairs pivoted on and depending from the member a transverse bar supported by and extending between one pair of rods, at their lower ends, a shaft supported by the other pair of rods at their lower ends, said shaft tapering outwardly from both ends to its center of length, a bushing about the shaft and normally engaging the same only at its point of greatest diameter, a transverse bar fixed on the bushing, said bars being adapted to engage a test beam adjacent its ends, and means mounted on the member for exerting a downward pressure on the beam intermediate its ends.

7. A beam testing machine comprising a rigid member, means for supporting said member a certain distance from the ground, longitudinally spaced bars to support a test beam adjacent its ends, means suspending the bar from said member, a jack mounted on and depending from the member and including a plunger disposed in a vertical plane centrally between the bars, and a bar to be engaged by the lower end of the plunger and to rest on and extend across the beam.

8. A beam testing machine including a pair of spaced bars on which to support a beam adjacent the ends thereof, individual supporting means for the bars, and means incorporated with the supporting means of one bar to permit of limited universal swivel movement of the bar about its center of length as an axis.

9. A beam testing machine including a pair of spaced bars on which to support a beam adjacent the ends thereof, means to individually and floatably support the bars, a pressure bar to rest on the beam intermediate its ends, and trammel plates adapted to extend between the bars on opposite sides of the beam and having notches for detachable engagement with all the bars to position them in definite and parallel relationship to each other.

In testimony whereof I affix my signature.

VILAS E. WATTS.